Jan. 22, 1957
E. R. FRYER
2,778,129
OFFSET CUTTING EDGE FOR SCRAPERS
Filed May 16, 1951
2 Sheets-Sheet 1
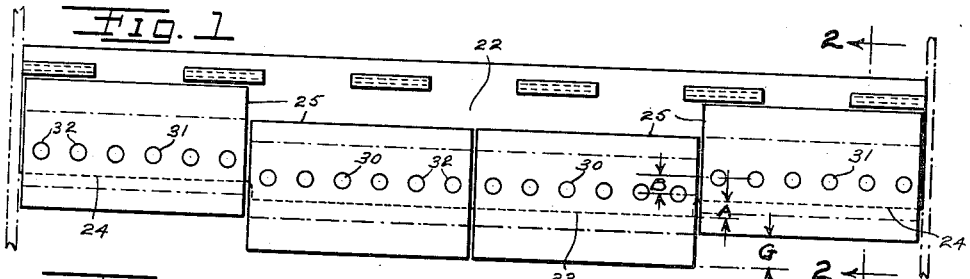
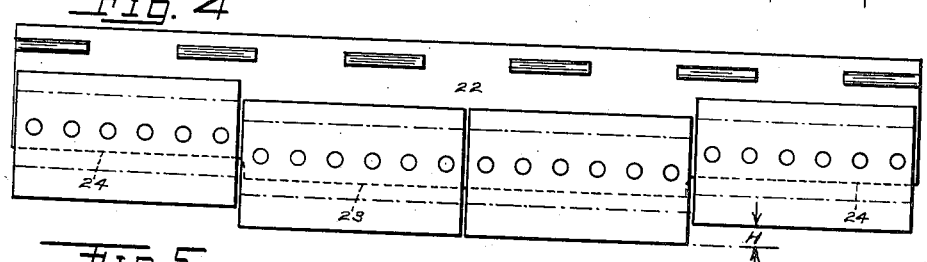
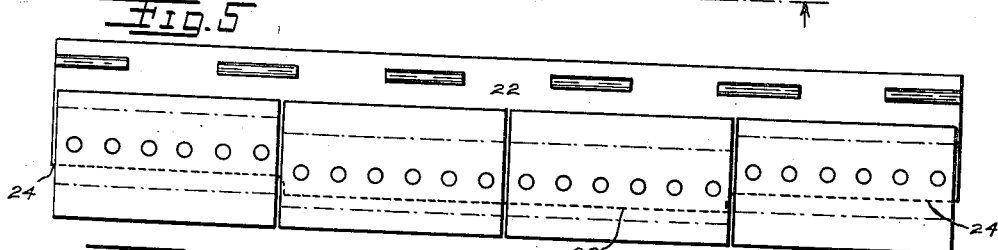
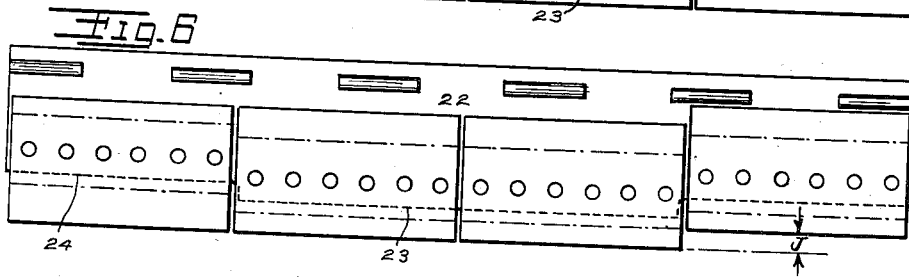
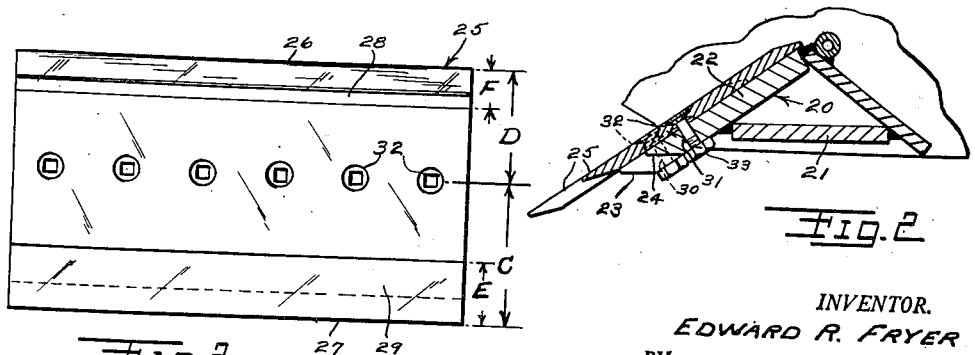
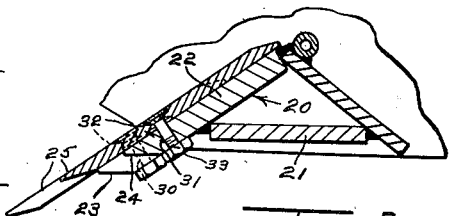
INVENTOR.
EDWARD R. FRYER
BY
Hyde, Meyer, Baldwin & Doran
ATTORNEYS Jan. 22, 1957 E. R. FRYER 2,778,129
OFFSET CUTTING EDGE FOR SCRAPERS
Filed May 16, 1951 2 Sheets-Sheet 2
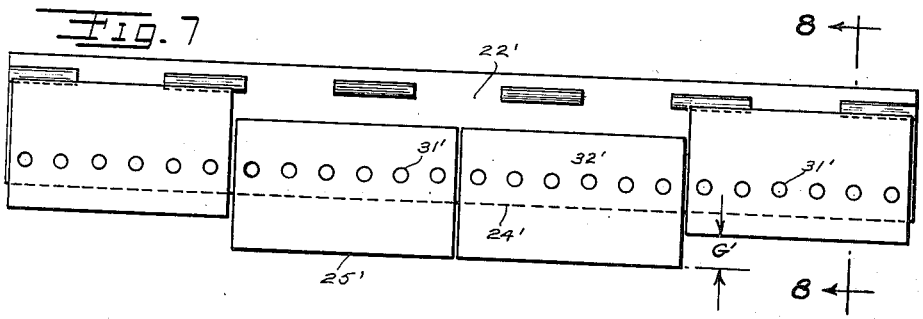
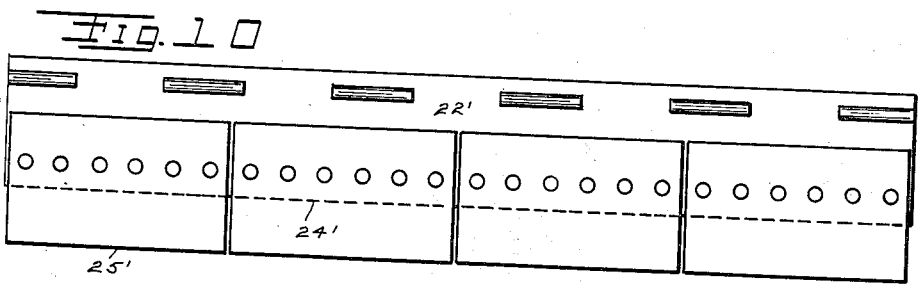
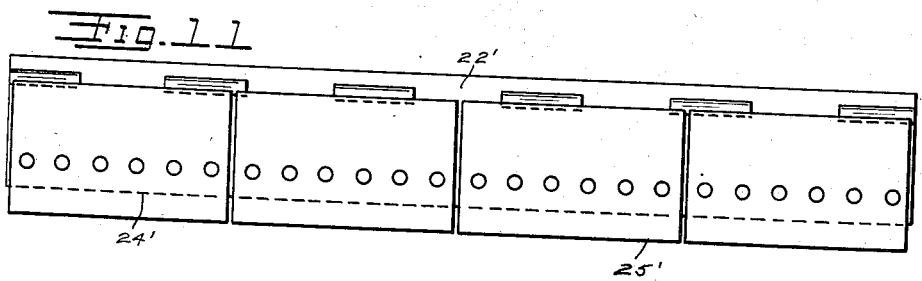
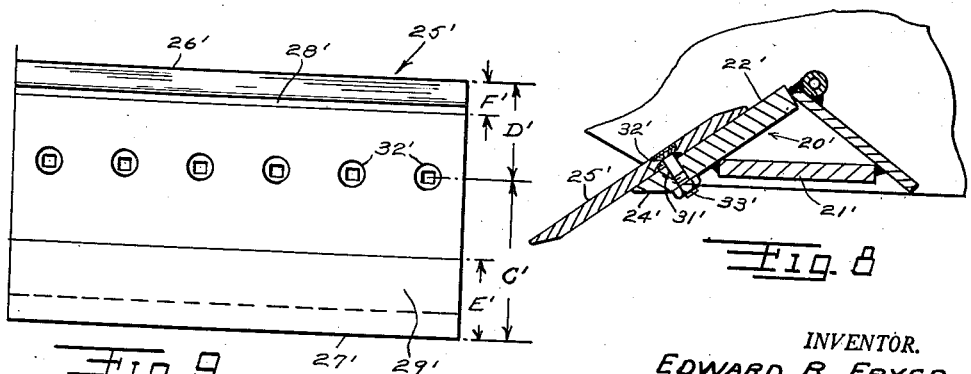
INVENTOR.
EDWARD R. FRYER
BY
Hyde, Meyer, Baldwin & Doran
ATTORNEYS

United States Patent Office 2,778,129
Patented Jan. 22, 1957

2,778,129

OFFSET CUTTING EDGE FOR SCRAPERS

Edward R. Fryer, Willoughby, Ohio, assignor, by mesne assignments, to General Motors Corporation, Detroit, Mich., a corporation of Delaware Application May 16, 1951, Serial No. 226,601

7 Claims. (Cl. 37—141)

This invention relates to improvements in cutters and cutting edges and more particularly to offset cutting edges for scrapers.

One of the objects of the present invention is to provide in a cutter of the type described cutting blades adapted to be located on and removably attached to the cutter base with the cutting edges of the blades forming either an offset or a straight cutting edge or any other desired cutting edge contour. The offset cutting edge can be of the one-side offset or drop-center cutting edge type.

Another object of the present invention is to provide in a cutter of the type described a cutter base with cutting blades, as set forth above, with the locating means for the blades extending in a straight line.

Another object of the present invention is to provide in a cutter of the type described a cutter base with cutting blades, as set forth above, with the locating means for the blades extending in two parallel lines, one ahead of the other.

Another object of the present invention is to provide in a cutter of the type described a cutter base with cutting blades, as set forth above with the locating means for the blades consisting of two locating means, the second being spaced behind and to a side of the first.

Another object of the present invention is to provide in a cutter of the type described a cutter base with cutting blades, as set forth above, with two blade locating means on the base, the more forward being in a protruding section of the base giving greater blade support for an offset cutting edge.

Another object of the present invention is to provide in a double edged cutting blade of the type described a locating means on the blade spaced closer to one edge than the other. If this blade is mounted in a cutter base in one of the combinations set forth above, it may be turned end for end to provide either an off-set or a straight cutting edge, interchangeability, and long cutting edge wear life.

Another object of the present invention is to provide in a double edged cutting blade, of the type described and as set forth above, hardened cutting edges, one cutting edge being hardened to a wider zone along the cutting edge than the other so that long cutting edge wear life can be obtained.

Other features of my invention reside in the arrangement and design of the parts for carrying out their appropriate functions.

Other objects and advantages of my invention will be apparent from the accompanying drawings and description and the essential features will be set forth in the appended claims.

In the drawings:

Fig. 1 is a plan view of the component blades arranged on the cutter base to form a drop center scraper cutting edge;

Fig. 2 is a vertical sectional view, enlarged, of the cutter taken along the line 2—2 of Fig. 1;

Fig. 3 is a plan view of one of the blades shown in Figs. 1 and 2;

Fig. 4 is a plan view of a drop center scraper cutting edge, similar to Fig. 1, but having a smaller offset;

Fig. 5 is a plan view of a straight cutting edge formed of the same blades shown in Figs. 1 or 4;

Fig. 6 is a plan view of a one-side offset cutting edge;

Fig. 7 is a plan view of a modified form of cutter having component blades arranged on a cutter base to form a drop center scraper cutting edge;

Fig. 8 is a vertical sectional view, enlarged, of the cutter taken along the line 8—8 of Fig. 7;

Fig. 9 is a plan view of one of the blades shown in Figs. 7 and 8;

Fig. 10 is a plan view of the blades arranged on the cutter base of the Fig. 7 modification to form a straight cutting edge; while Fig. 11 is a plan view of a straight cutting edge type cutter, similar to Fig. 10, but with a smaller overhang.

The offset cutting edge of this invention has a plurality of identical component blades. By making them identical, manufacture and supply problems are simplified. These blades are interchangeable to provide long cutting edge wear life and various cutting edge contours. While the cutter and the offset cutting edge of this invention might be adapted to various types of machines, the drawings and specification disclosed it as applied to a digging and carrying scraper of the general type shown in the copending application to William J. Adams, entitled "Bowl and Apron Controls For Carrying Type Scraper," Serial No. 111,496, filed August 20, 1949, issued as U. S. Patent No. 2,674,815 on April 13, 1954.

The "double offset type" is the preferred form and is disclosed in Figs. 1 to 6 of the drawings.

The cutter base is indicated generally at 20. It consists of a front surface 22 supported by a brace 21. The front surface has a forwardly protruding middle section or leading edge 23 and a rearwardly spaced leading edge 24 laterally on each side of the edge 23. This protruding middle section extends forward a distance A in Fig. 1 and gives added support to the blades when they are arranged in the drop center cutting edge relationship, as seen in Fig. 1. Since the blades have less overhang, they are less likely to break and will wear for a longer period of time. The distance A of this protrusion is generally equal to the distance B between the lines of holes in the base, but this invention contemplates other relationships between these distances, as will appear.

Each double edged blade 25 mounted on the cutting base is of the same design. Four blades 25 are shown mounted on the cutter base in Fig. 1. These blades may be rearranged to form other types of cutting edges as desired. Hence, a separate blade is not needed for each type cutting edge used in normal scraper operation. Each blade has opposed cutting edges 26 and 27 with the cutting edges being parallel to each other. It should be noted that even though cutting edges 26 and 27 are disclosed as being parallel to each other, the invention contemplates that these edges may be of any contour desired and need not be straight cutting edges. Each cutting edge has a hardened area 28 or 29 of width F or E, respectively. Fig. 3 discloses that one cutting edge is hardened to a wider zone along the cutting edge than the other. The holes 32 in the blade 25 are spaced closer to one cutting edge than the other. The variations of width in hardness zone are designed to give the maximum wear life to each of the edges 26 or 27 of the blade. The hardness extends up to approximately the leading edges 23 or 24 when the blade is mounted on the cutter base 20, as shown in Fig. 2. In other words, the distances D minus F or C minus E are approximately equal to the distances from holes 31 to edge 24 or from holes 30 to edge 23 in Fig. 2. Hence, these two different hardness zone widths are directly related to the offset locating holes 32 in the blade and holes 30, 31 in the cutter base, to the variety of scraper cutting edge arrangements shown, and to the amount of cutting edge wear life obtainable from each edge 26 or 27 of the reversible blades 25.

Locating means is provided on the base and on each blade coacting with each other so that either cutting edge of each blade may be presented forwardly in cutting position. A means is also provided to removably attach each blade to said base. Although the locating means and the attaching means might be separate and distinct elements, Figs. 1 to 6 disclose them as a single structure, namely, bolts and bolt holes. This structure consists of holes 30, 31 in the base and holes 32 in the blades, with bolt and nut connections 33 adapted to secure the blades to the base. Locating means or holes 30 are in the protruding middle section 23 of the base while locating means or holes 31 are also in the base but spaced parallel with, behind and to a side of locating means 30. Holes 31 are spaced a distance B behind holes 30. Although the holes 30 and 31 are disclosed as lying in two parallel lines which extend perpendicular to the direction of movement of the cutter, the holes to attach and locate any one blade may extend at a different angle than merely perpendicular to the direction of movement of the cutter.

The locating means or holes 32 in each blade are spaced a given distance closer to one cutting edge than to the other. This distance is equal to the distance between the spaced locating means 31 and 30. In other words, distance C minus D equal B in Figs. 1 and 3. Also, the distance B is twice as great as the distance that the holes 32 are offset from the transverse center line of the blade 25.

Although the locating means is shown as having holes 30, 31 and 32, this invention contemplates that the locating means may take the form of straight edges, projections or X-shaped slots.

Figs. 1, 4, 5 and 6 illustrate the various types of cutting edge contours obtainable by interchanging blades 25. Fig. 1 illustrates a drop center scraping edge arrangement with the two center blades protruding G distance ahead of the end blades. This arrangement gives the largest overhang or offset in the drop center cutting edge arrangement. In this case, the dimension C (Fig. 3) is toward the front of the two center blades and toward the rear of the two side blades. It is ideal for cutting and loading certain kinds of soils.

Fig. 4 illustrates a drop center cutting edge arrangement with the two center blades protruding H distance ahead of the end blades. Dimension C is toward the front of all four blades. This arrangement gives maximum overhang from all four blades, and thereby maximum wear life is obtained from each cutting edge from all four blades at one setting of the blades. Of course, each of the blades of Fig. 4 could be turned end for end which would still maintain a drop center cutting edge arrangement with an H distance protrusion. The dimension D (Fig. 3) would then be toward the front of each blade. However, this would provide a minimum overhang for each of the four blades. This latter arrangement with minimum overhang is probably best for boulders and rocky soil.

Fig. 5 illustrates a straight cutting edge with all four blades having their cutting edges in a straight line for land leveling and smooth grading, for grading ditches and back slopes and for a level cut and a level spread on any earth moving job. This arrangement is also better for loading the scraper bowl in some types of soil. Here, dimension D is toward the front of the center blades and dimension C is toward the front of the side blades.

Fig. 6 discloses a one-side offset arrangement. Of course, either the right or left end blades of the scraper cutting edge may be set back of the remaining three blades even though Fig. 6 discloses only the blade on the right-hand end being set back. This arrangement would be desirable for making the rough scraper cut on a steep side slope.

It has been found that a very practical set of dimensions for this invention are these: A equals 2 inches, B equals 2 inches, C equals 9 inches, D equals 7 inches, E equals 4 inches, F equals 2½ inches, G equals 4 inches, H equals 2 inches, and J equals 2 inches. Of course, the offsets and these dimensions may be greater or less with wider or narrower blades to secure similar combinations of scraping edges and still utilize the principles outlined here.

The cutter of this invention may be truly termed a universal cutter, since a scraper operator may obtain a wide variety of cutting edges even though he uses only one standard type of blade. He can arrange the blades to form the best type of cutting edge for each type of soil condition or job condition that he encounters. A separate blade for each job is not needed. As contrasted with the standard scraper blade, the blades of this invention are cheaper to produce, have a lower maintenance cost and require a smaller investment in inventory for the scraper owner. They are shorter and lighter in weight and, hence, are more easily handled and mounted on the scraper cutter base. If one section breaks in use or if one section wears faster than the others, only this one section needs to be replaced. This replacement procedure is cheaper and faster than heretofore. Of course, the broken or worn section may, if desired, be merely turned end for end and then interchanged with one of the other blades of the cutting edge. Since the operator of the scraper may reverse or turn the blades end for end and may also interchange them, maximum cutting edge wear life is obtained. For instance, side and center blades of Fig. 1 may be reversed and interchanged to give four new cutting edges.

Figs. 7 to 11, inclusive, disclose a second form of this invention called the "single offset type." This second form obtains some of the same results of the first form but in a slightly different manner. It also has certain disadvantages over the first form. For example, the center cutting blades are not as well supported.

The cutter base, indicated generally at 20', consists of a front surface 22' rigidly supported by a brace 21'. The front surface does not have a protruding middle section, as found in the first form of the invention disclosed in Figs. 1 to 6. Front surface 22' has a straight leading edge 24'.

The double edged blades 25' are each of the same design and have parallel cutting edges 26' and 27'. As in the first form of the invention, these cutting edges need not be parallel nor have a straight edge.

Each cutting edge has a hardened area 28' or 29'. One cutting edge is hardened to a wider zone along its cutting edge than the other. The difference in width of hardness is indicated by dimensions E' and F' in Fig. 9. The locating and attaching means or holes 32' in the blade 25' are spaced closer to one cutting edge than the other. The variations of width in hardness zone are designed to give the maximum wear life to each of the edges 26', 27' of the blade. The hardness extends up to approximately the leading edge 24' when the blade is mounted on the cutter base 20', as shown in Fig. 8. In other words, the distances D' minus F' or C' minus E' are approximately equal to the distance from the holes 31' to the leading edge 24' in Fig. 8. Hence, these two different hardness zone widths are directly related to the offset locating holes 32' in the blade and holes 31' in the cutter base, to the variety of scraper cutting edge arrangements shown, and to the amount of cutting edge wear life obtainable from each edge 26' or 27' of the reversible blades 25'.

Locating means is provided on the base and on each blade that coact with each other whereby either cutting edge of each blade may be presented in cutting position. A means is also provided to removably attach each blade to the base. Although the attaching means and the locating means may be separate structural elements, they are disclosed as being all one cooperating structure in Figs. 7 to 11. The means consist of holes 31' in the cutter base, holes 32' in the blades, and the bolt and nut unit 33' to detachably align the holes together. Of course, the locating means need not consist of holes 31' and 32' but may be a locating means of a different sort, for example, straight edges, projections, X-shaped slots, etc. The holes 31' in the base extend in a straight line perpendicular to the direction of movement of the cutter. Of course, this invention contemplates that the holes needed to mount any one cutter may extend at another angle to the direction of movement other than a right angle.

The holes 32' in the blades 25' are spaced a given distance closer to one cutting edge than the other. This is shown by dimensions C' and D' in Fig. 9. This spacing of the holes determines the offset of the cutting edge. For example, the distance C' minus D' of Fig. 9 must be equal to the offset distance G' of the cutting edge in Fig. 7.

The "single offset type" cutting edge also has a wide variety of cutting edge forms. Fig. 7 shows a drop center type scraper cutting edge arrangement, similar to Fig. 1, with the two center blades protruding G' distance ahead of the end blades. Fig. 10 shows a straight cutting edge with a long overhang to the blades; while Fig. 11 shows a straight cutting edge with a short overhang. This second form of the invention may also provide a one-side offset arrangement, similar to Fig. 6 in the first modification, by merely having either of the two end blades in Fig. 7 reversed. This would provide an offset of G' distance at one end only of the cutting edge.

It has been found in practice that the following dimensions give satisfactory results with this second form of cutter: C' equals 10 inches, D' equals 6 inches, E' equals 5 inches, F' equals 2 inches, and G' equals 4 inches. Of course, the offsets and these dimensions may be made greater or less and could be used with wider or narrower blades to secure similar combinations of scraper cutting edges.

What I claim is:

1. A cutter comprising a cutter base having a forwardly protruding section, locating means on said protruding section, another locating means on said base in a zone laterally removed from said section spaced behind and to a side of said first locating means, said other locating means being parallel to said locating means on said protruding section, a plurality of blades at least one for said section and one for said zone, means to removably attach each blade on said base, each blade being double edged, a locating means on each blade coacting with one of the locating means on said base, said locating means being transversely spaced generally vertical apertures, said locating means on each blade being spaced a given distance closer to one cutting edge than to the other, the distance in the rearward direction between the spaced locating means on the base and said given distance being equal, whereby the blades may be interchanged and turned end for end to provide various cutting edge contours.

2. A cutter comprising a cutter base, locating means on said base extending perpendicular to the direction of movement of said cutter, a plurality of substantially identical blades including at least three which in end to end relationship equal the length of said base, means to removably attach each blade on said base, each blade being double edged with parallel cutting edges, a locating means on each blade coacting with the locating means on said base, said locating means being transversely spaced generally vertical apertures, said locating means on each blade being spaced a given distance closer to one cutting edge than to the other, whereby the blades may be interchanged and turned end for end to provide a drop center cutting edge, a straight cutting edge or a one-side offset cutting edge and to provide interchangeability and long wear life in each blade.

3. A cutter comprising a cutter base, locating means on said base extending in a straight line perpendicular to the direction of movement of said cutter, a plurality of substantially identical blades including at least three which in end to end relationship equal the length of said base, means to removably attach each blade on said base, each blade being double edged with parallel transverse cutting edges, a locating means on each blade coacting with the locating means on said base, said locating means being transversely spaced generally vertical apertures, said locating means on each blade being in a single line parallel to a cutting edge and spaced a given distance closer to one cutting edge than to the other, whereby the blades may be interchanged and turned end for end to provide a drop center cutting edge, a straight cutting edge or a one-side offset cutting edge and to provide interchangeability and long wear life in each blade.

4. A cutter comprising a cutter base having a forwardly protruding section, locating means on said protruding section extending perpendicular to the direction of movement of said cutter, another locating means on said base spaced parallel with, behind and to a side of said first locating means, said other locating means being parallel to said locating means on said protruding section, a plurality of blades, means to removably attach each blade on said base, each blade being double edged with parallel transverse cutting edges, a locating means on each blade coacting with one of the locating means on said base, said locating means being transversely spaced generally vertical apertures, said locating means on each blade being parallel to a cutting edge and spaced a given distance from the transverse centerline of the blade, the distance between the spaced parallel locating means on the base being twice said given distance, whereby the blades may be interchanged and turned end for end to provide a drop center cutting edge, a straight cutting edge or a one-side offset cutting edge and to provide interchangeability and long wear life in each blade.

5. An earth cutter for a scraper comprising a cutter base, said cutter base having a forwardly protruding middle section, said base having a series of laterally spaced generally vertical holes arranged in two parallel lines extending perpendicular to the direction of movement of said cutter, the forwardmost line of said holes being in said protruding section while the rearwardmost line being in said base at each side of said protruding section, a plurality of blades adapted to be removably attached to said base, each blade being double edged with parallel transverse cutting edges, each blade having a series of laterally spaced generally vertical holes parallel to a cutting edge but spaced a given distance from the transverse centerline of the blade and adapted to align with some of the holes in the cutter base, means to attach and align each blade to said base by said holes, the distance between said two parallel lines being twice said given distance, whereby the blades may be interchanged and turned end for end to provide a drop center cutting edge, a straight cutting edge or a one-side offset cutting edge and to provide interchangeability and long wear life in each blade.

6. A cutter as set forth in claim 5, each of the cutting edges of each double edged blade being hardened, one cutting edge being hardened to a wider zone along the cutting edge than the other, said wider hardened zone being on that edge of a blade farthest removed from said series of holes in said blade.

7. A cutter, as set forth in claim 5, wherein all blades are substantially identical in shape and size so as to permit interchangeability.

(References on following page)

References Cited in the file of this patent

UNITED STATES PATENTS

| | | |
|---|---|---|
| 1,867,871 | Burkenbeuel | July 19, 1932 |
| 2,154,503 | French et al. | Apr. 18, 1939 |
| 2,220,819 | Johnson | Nov. 5, 1940 |
| 2,310,396 | Clinkscales | Feb. 9, 1943 |
| 2,329,831 | Ferguson | Sept. 21, 1943 |
| 2,443,492 | Austin | June 15, 1948 |
| 2,577,877 | Daniels | Dec. 11, 1951 |
| 2,629,945 | Przybylski | Mar. 3, 1953 |